(12) United States Patent
Hashimoto

(10) Patent No.: US 11,456,649 B2
(45) Date of Patent: Sep. 27, 2022

(54) ROTATING ELECTRICAL MACHINE AND MANUFACTURING METHOD THEREOF

(71) Applicant: AISIN CORPORATION, Kariya (JP)

(72) Inventor: Junichi Hashimoto, Kariya (JP)

(73) Assignee: AISIN CORPORATION, Kariya (JP)

( * ) Notice: Subject to any disclaimer, the term of this patent is extended or adjusted under 35 U.S.C. 154(b) by 213 days.

(21) Appl. No.: 16/897,635

(22) Filed: Jun. 10, 2020

(65) Prior Publication Data

US 2020/0395824 A1 Dec. 17, 2020

(30) Foreign Application Priority Data

Jun. 12, 2019 (JP) .............................. JP2019-109303

(51) Int. Cl.
*H02K 13/04* (2006.01)
*H02K 3/28* (2006.01)

(52) U.S. Cl.
CPC ............... *H02K 13/04* (2013.01); *H02K 3/28* (2013.01)

(58) Field of Classification Search
CPC .......... H02K 13/04; H02K 3/28; H02K 3/527; H02K 13/10
See application file for complete search history.

(56) References Cited

U.S. PATENT DOCUMENTS 3,524,251 A * 8/1970 Burr ..................... H02K 3/00
29/598

FOREIGN PATENT DOCUMENTS

EP 3282567 A2 * 2/2018
JP 2004343971 A 12/2004

OTHER PUBLICATIONS

JP2004343971AEnglishtranslation (Year: 2022).*
EP3282567A2Englishtranslation (Year: 2022).*

* cited by examiner

*Primary Examiner* — Tulsidas C Patel
*Assistant Examiner* — Viswanathan Subramanian
(74) *Attorney, Agent, or Firm* — Buchanan Ingersoll & Rooney PC

(57) ABSTRACT

A rotating electrical machine includes a coil, a rotor including a shaft, a rotor core, a commutator including plural hooks being provided with a first hook to which an end of the coil is connected, the coil wound on a predetermined tooth of plural teeth, and an insulator attached to the rotor core, and a stator. The insulator includes an annular portion provided to surround the plural hooks which are aligned along a circumferential direction of the shaft, and a protrusion protruding opposite to the rotor core. The protrusion is arranged on a path where an end part of the coil passes through, the end part corresponding to an area from a part connected to the predetermined tooth to the end of the coil connected to the first hook, the protrusion being hooked by the end part.

7 Claims, 11 Drawing Sheets

ROTATING ELECTRICAL MACHINE AND MANUFACTURING METHOD THEREOF

CROSS REFERENCE TO RELATED APPLICATIONS

This application is based on and claims priority under 35 U.S.C. § 119 to Japanese Patent Application 2019-109303, filed on Jun. 12, 2019, the entire content of which is incorporated herein by reference.

TECHNICAL FIELD

This disclosure generally relates to a rotating electrical machine and a manufacturing method thereof.

BACKGROUND DISCUSSION

A known rotating electrical machine including an insulator which is attached on a rotor core is disclosed in JP2004-343971A (hereinafter referred to as Patent reference 1).

According to Patent reference 1, a commutator motor (a rotating electrical machine) including an insulating plate (the insulator) attached on an iron core (a rotor core) is disclosed. The commutator motor includes a rotating shaft, a coil, a commutator, and a protruding wall. The iron core includes a core having plural core pieces. The coil is wound on the plural core pieces in a pulled state (tensioned state). The commutator includes contact pieces which are electrically connected with end parts of the coil, respectively, wound on the plural core pieces.

Insulating plates disclosed in Patent reference 1 are press-fitted into opposing end portions of the iron core in an extending direction of the rotating shaft to insulate the iron core from the coil. The protruding wall is annually formed and protrudes toward the commutator in the extending direction of the rotating shaft from one of the insulating plates, the one arranged at a side where the commutator is provided.

According to the commutator motor of Patent reference 1, the commutator is press-fitted by the rotating shaft press-fitted by the iron core up to a position away from the iron core. The coil is wound on the plural core pieces of the iron core in a pulled state or in a tensioned state while the commutator is arranged away from the iron core, and is connected to the contact pieces in a state where the end parts of the coil are pulled. Then, the commutator is press-fitted (repress-fitted) until a position close to the iron core from the position away from the iron core, and the assembling process of a rotator is completed.

According to the commutator motor disclosed in Patent reference 1, to reduce looseness of the end parts of the coil occurred due to the movement of the commutator to the position close to the iron core, the end parts of the coil are in the pulled state by being in contact with the protruding wall annually protruding toward the commutator. The protruding wall annually formed is contactable with the end parts of the coil regardless of where the end parts of the coil are arranged.

In the commutator motor disclosed in Patent reference 1, parts other than the end parts of the coil may be pulled by the protruding wall protruding annually when the core is wound on the plural core pieces at the position away from the iron core. In this case, the coil wound on the core pieces in the pulled state pulled thereby may be cut, depending on the protruding amount of the protruding wall, due to a load applied to the parts of the coil other than the end parts thereof in a state of being pulled by the protruding wall. Accordingly, the height of the protruding wall of the commutator motor is required to be reduced, and as the protruding wall including a sufficient protruding amount cannot be provided at one of the insulating plates, it is difficult to reduce the looseness of the coil after the repress-fit while preventing the coil from being cut.

A need thus exists for a rotating electrical machine and a manufacturing method which is not susceptible to the drawback mentioned above.

SUMMARY

According to an aspect of this disclosure, a rotating electrical machine includes a coil, a rotor including a shaft, a rotor core including plural teeth on which the coil is wound, a commutator including plural hooks being provided with a first hook to which an end of the coil is connected, the coil wound on a predetermined tooth of the plural teeth, and an insulator attached to the rotor core, and a stator arranged to face the rotor in a radial direction. The insulator includes an annular portion protruding opposite to the rotor core, the annular portion provided to surround the plural hooks which are aligned along a circumferential direction of the shaft, and a protrusion protruding opposite to the rotor core relative to a distal end of the annular portion, the distal end arranged opposite to the rotor core. The protrusion is arranged on a path where an end part of the coil passes through, the end part corresponding to an area from a part connected to the predetermined tooth to the end of the coil connected to the first hook, the protrusion being hooked by the end part.

According to another aspect of this disclosure, a manufacturing method of an electronic machine including processes of, press-fitting a shaft fixed with a commutator which includes plural hooks into a rotor core including plural teeth up to a predetermined position in a state where the rotor core is attached with an insulator including an annular portion which is arranged to surround the plural hooks and a protrusion protruding opposite to the rotor core relative to a distal end of the annular portion, winding the coil to the predetermined tooth of the plural teeth and connecting an end of the coil to a predetermined hook of the plural hooks after the press-fitting process of the shaft fixed with the commutator up to the predetermined position, and re-press fitting the shaft fixed with the commutator into the rotor core and hooking an end part of the coil, the end part corresponding to an area from a part connected to the predetermined tooth to the end of the coil connected to the predetermined hook, to the protrusion of the insulator arranged on a path of the end part of the coil after the end of the coil is connected to the predetermined hook.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment of the disclosure will hereunder be explained with reference to the drawings.

A rotating electrical machine 100 of the embodiment will hereunder be explained with reference to FIGS. 1 to 10.

Figure 1:
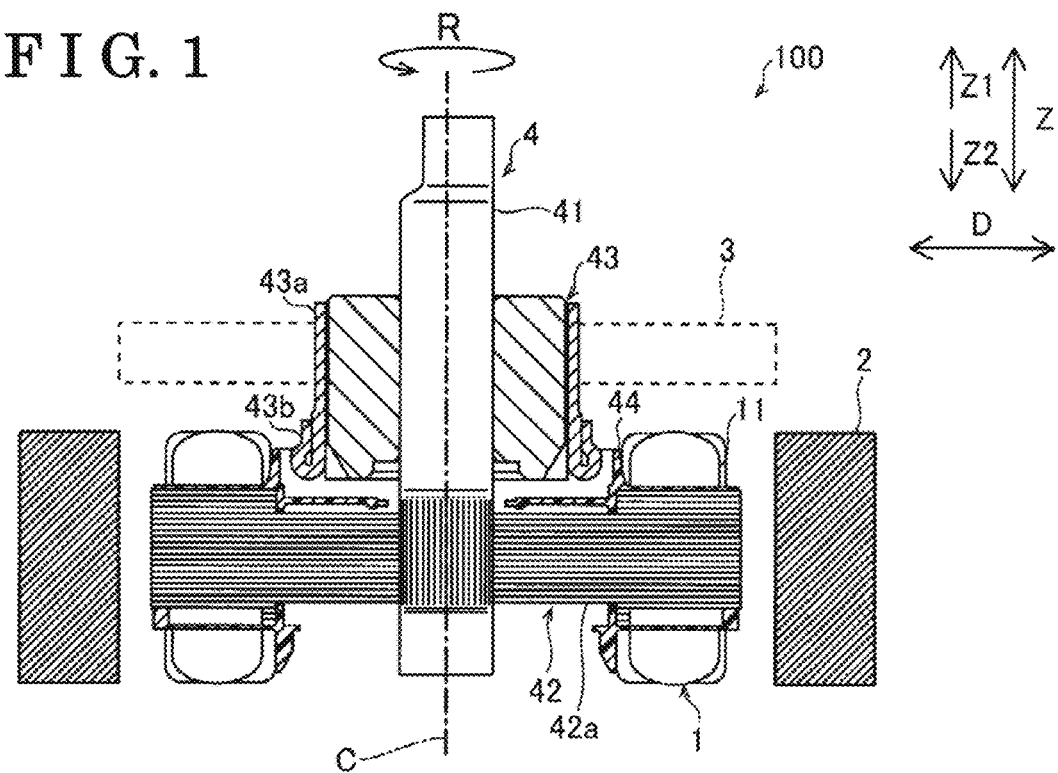
FIG. 1 is a cross sectional view of a rotating electrical machine of an embodiment disclosed here.
Figure 2:
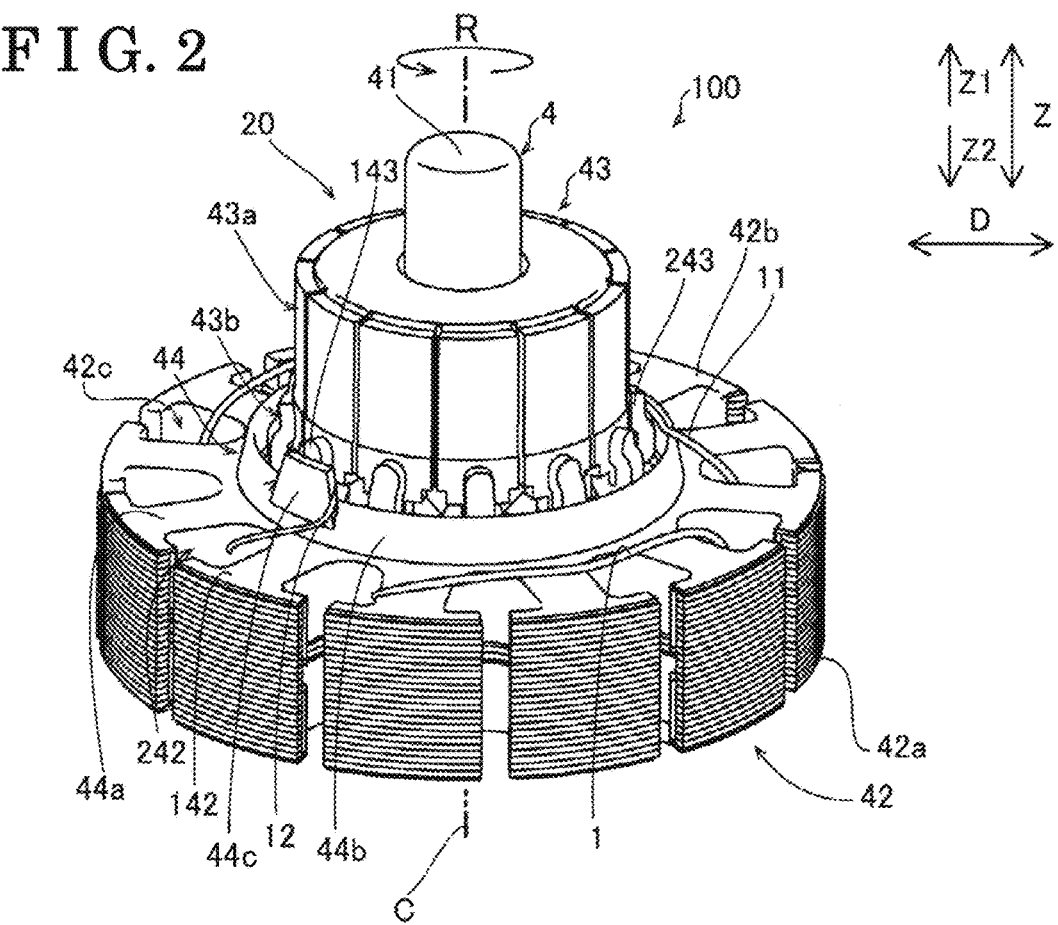
FIG. 2 is a perspective view of the rotating electrical machine of the embodiment.

As illustrated in FIGS. 1 and 2, the rotating electrical machine 100 is configured as, for example, a direct-current motor with a brush. To be specific, the rotating electrical machine 100 includes a coil 1, a stator 2, a power-supply brush 3, and a rotor 4.

The stator 2 and the rotor 4 of the rotating electrical machine 100 in a Z2 direction are covered by a motor case. The stator 2 and the rotor 4 of the rotating electrical machine 100 in a Z1 direction are covered by a folder. The coil 1 corresponds to a conductor wire or a lead wire. Plural (for example, twelve) teeth 42b are wound over by the coil 1. A coil portion 11 is formed such that the coil 1 is wound on the plural teeth 42b. The coil potion 11 is wound by a distribute winding in which the plural (for example, three) teeth 42b are wound by the coil 1. The number of the teeth 42b wound by the coil portion 11 is not limited to three.

The stator 2 is configured to generate magnetic force for rotating the rotor 4. The stator 2 includes, for example, permanent magnets. The stator 2 is fixed to an inner surface of the motor case. The power-supply brush 3 is configured to obtain or acquire power from outer source and supply the obtained power or acquired power to a commutator 43. The commutator 43 and the power supply brush 3 are in contact with each other. The power supply brush 3 is fixed to the folder.

The rotor 4 is configured to rotate about a rotating axis C of a shaft 41 by magnetic force generated at the rotor 4 and of the stator 2. More specifically, the rotor 4 includes the shaft 41, a rotor core 42, and the commutator 43.

Hereinafter, the axial direction of the shaft 41 corresponds to a Z direction, one direction of the Z direction toward the commutator 43 corresponds to the Z1 direction, and the other direction toward the rotor core 42 corresponds to the Z2 direction. A circumferential direction of the shaft 41 corresponds to a R direction. A radial direction of the shaft 41 corresponds to a D direction.

The rotor 4 faces the stator 2 in the D direction. As such, the rotating electrical machine 100 is configured as a motor having an inner rotor.

The shaft 41 is configured to be rotatable about the rotating axis C extending in the Z direction. The rotor core 42 is formed such that plural electromagnetic steel plates 42a each including a thorough hole press-fitted by the shaft 41 are stacked with one another while rotating in the R direction. The rotor core 42 includes the plural teeth 42b and plural slots 42c. The plural teeth 42b is wound by the coil 1. The plural teeth 42b each protrudes outwardly in a direction orthogonal to the Z direction from a position adjacent to the through hole press-fitted by the shaft 41. The plural slots 42c each corresponds to a space provided between the plural teeth 42b. The rotor core 42 is configured to integrally rotate with the shaft 41.

The commutator 43 includes plural (for example, twelve) segments 43a and plural (for example, twelve) hooks 43b. The plural segments 43a include a clearance therebetween and are equally spaced with one another when viewed in the Z1 direction. The power supply brush 3 is in slidably in contact with each of the plural segments 43a. Each of the plural hooks 43b is fixed by each of the plural segments 43a. The plural hooks 43b each is configured to be attached by being hooked (locked) by a start portion or an end portion of the coil 1, the start portion where the coil 1 starts being wound, and the end portion where the coil 1 ends being wound. Each of the plural hooks 43b is configured to electrically connect the coil 1 to the segment 43a by a joining process, for example, a fusion welding process in a state where the start portion and the end portion of the coil 1 are arranged.

Figure 3:
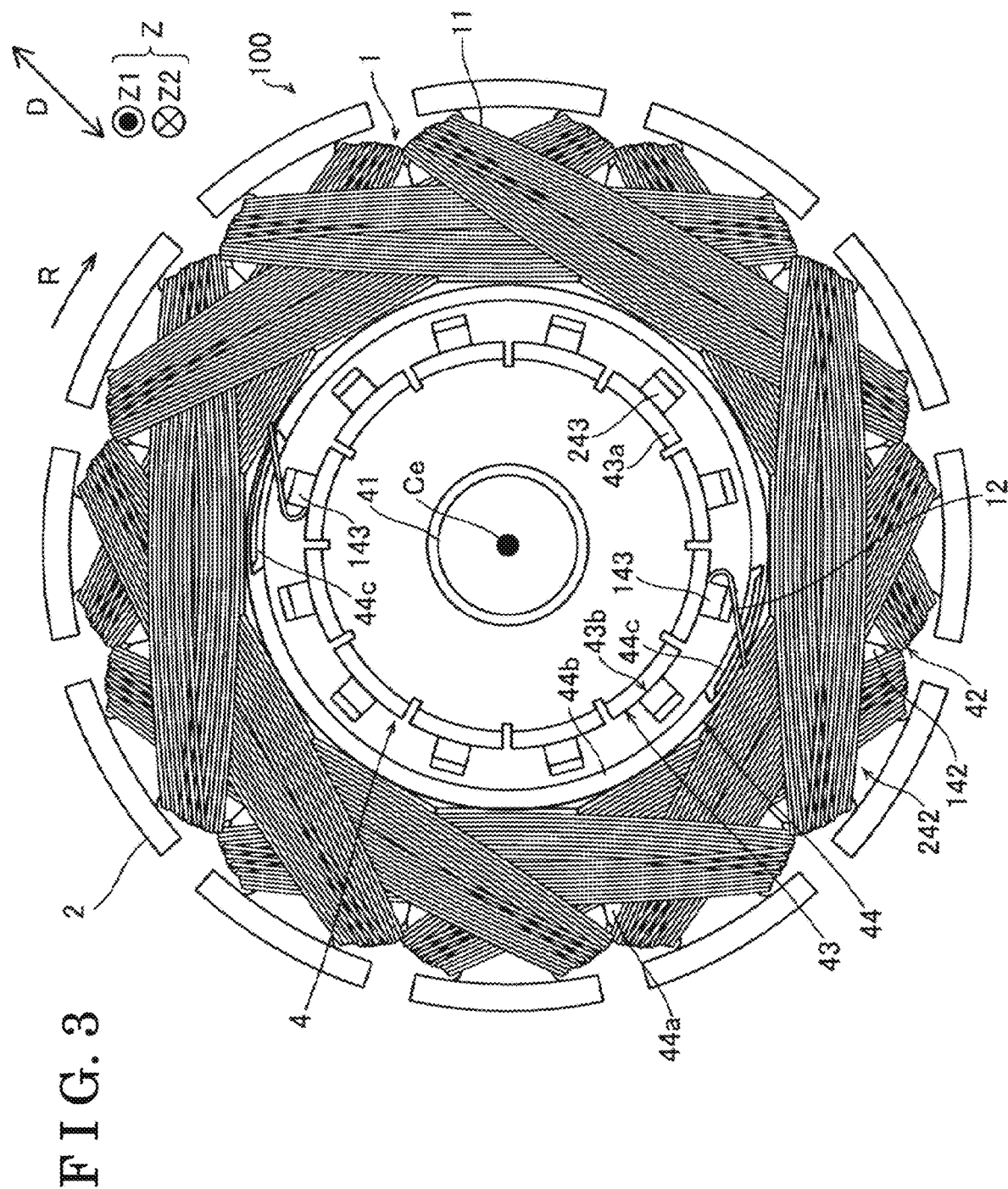
FIG. 3 is a plan view of the rotating electrical machine of the embodiment.

As shown in FIGS. 2 and 3, the plural hooks 43b includes first hooks 143 (i.e., a predetermined hook) and second hooks 243.

The first hook 143 is configured to be connected by an end of the coil 1 wound on a predetermined tooth 142 of the plural teeth 42b. That is, the first hook 143 is connected with the end of the coil 1 penetrating in the predetermined slot 242 which is arranged adjacent to the predetermined tooth 142. The first hooks 143 are disposed at plural (for example, two) positions. The first hooks 143 are arranged point-symmetrically with respect to a center point Ce of the shaft 41. The first hook 143 is set depending on how the coil 1 is wound relative to the plural teeth 42b.

Here, how the coil 1 is wound depends on a device employed for winding the coil 1 to the plural teeth 42b or whether the coil 1 is wound by a concentrated winding or by the distributed winding with respect to the plural teeth 42b. For example, the first hook 143 is set at a single position in a case where a single flyer is employed for winding the coil 1 on the plural teeth 42b, and is set at two positions in a case where a double flyer is employed.

An end part 12 corresponds to an end part of the coil 1 connected to the first hook 143 from the predetermined tooth 142. That is, the end part 12 of the coil 1 corresponds to a part from a part being out from the predetermined slot 242 to a part connected to the first hook 143. The end part 12 of the coil 1 wound on the predetermined tooth 142 is arranged outwardly (see FIG. 9) in the R direction.

The second hooks 243 each corresponds to a hook other than the first hook 143, the hook which is not connected with the end part of the coil 1 wound on the predetermined tooth 142. The second hooks 243 are arranged at plural (for example, ten) positions. The second hooks 243 are arranged linear-symmetrically with respect to a line extending in a direction in which the first hooks 143 are aligned.

The rotor 4 includes an insulator 44 attached to the rotor core 42. The insulator 44 is configured to insulate the coil 1 from the rotor core 42. For example, the insulator 44 is made from a resin material. The insulator 44 is disposed so as to cover an outer surface of the rotor core 42.

Figure 4:
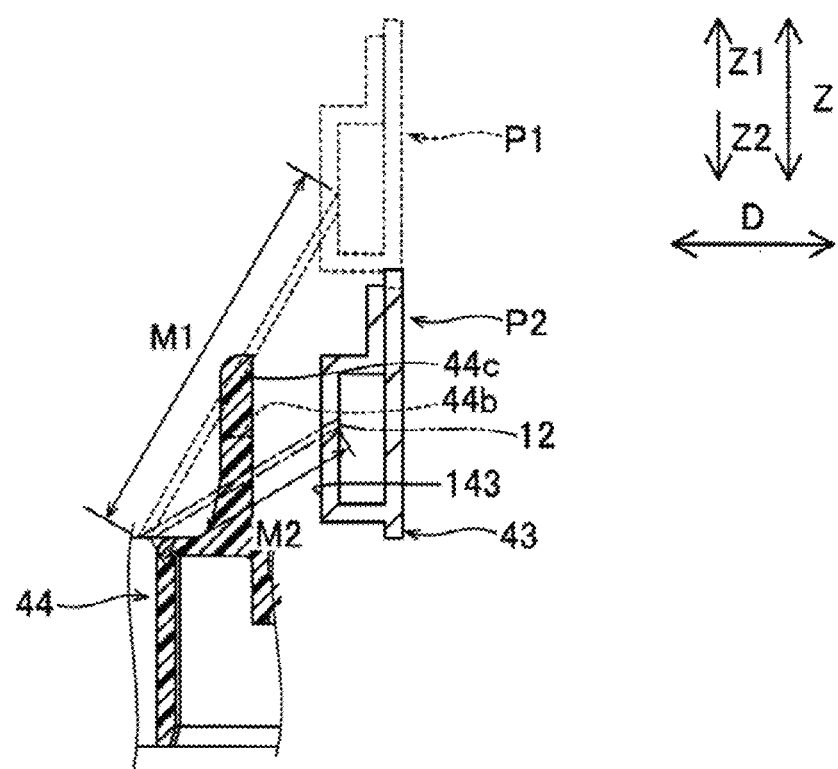
FIG. 4 is a cross sectional view of the rotating electrical machine of the embodiment illustrating a first shortest distance before repress-fit, and a second shortest distance after the repress-fit.

Here, as shown in FIG. 4, comparing a first shortest distance M1 (a distance of the end part 12 of the coil 1 illustrated with a dotted line) of the end part 12 of the coil 1 before repress-fit when the commutator 43 is arranged at a position P1 away from the rotor core 42 (see FIG. 2) with a second shortest distance M2 (a distance of the end part 12 of the coil 1 illustrated with a dotted chain line) of the end part 12 of the coil 1 after the repress-fit when the commutator 43 is repress-fitted into the rotor core 42 up to a predetermined position P2, the first shortest distance M1 is longer than the second shortest distance M2. The first shortest distance M1 corresponds to a distance in which the end part 12 of the coil 1 is connected to the first hook 143 in a pulled state or tensioned state when the commutator 43 is arranged at the position P1 away from the rotor core 42. The second shortest distance M2 corresponds to a distance in which the end part 12 of the coil 1 is connected to the first hook 143 in a pulled state or tensioned state when the commutator 43 is repress-fitted into the rotor core 42 to the predetermined position P2. In a state where protrusions 44c are not provided and the commutator 43 is repress-fitted into the rotor core 42 to the predetermined position P2 from the first distance M1, the end part 12 of the coil 1 after the repress-fit may loosen by a predetermined difference (hereinafter referred to as a predetermined difference or looseness) between the first shortest distance M1 and the second shortest distance M2.

Figure 5A:
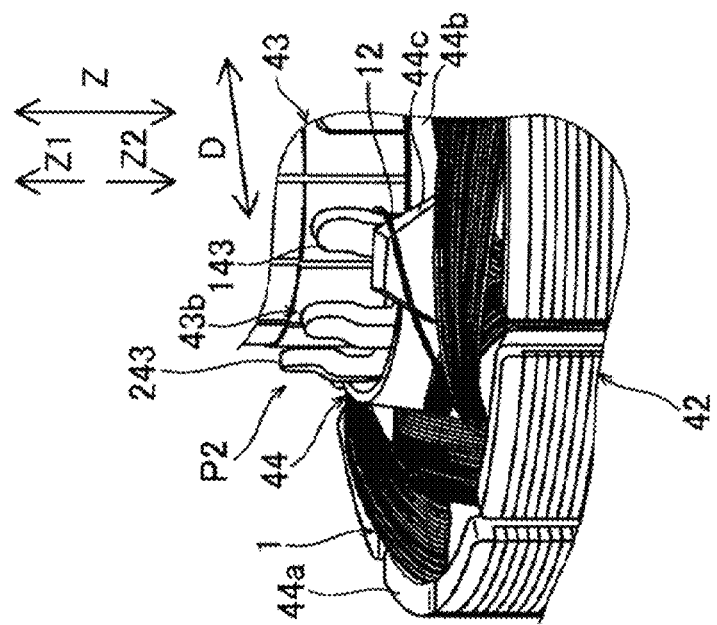
FIG. 5A is a perspective view of the rotating electrical machine before the repress-fit.
Figure 5B:
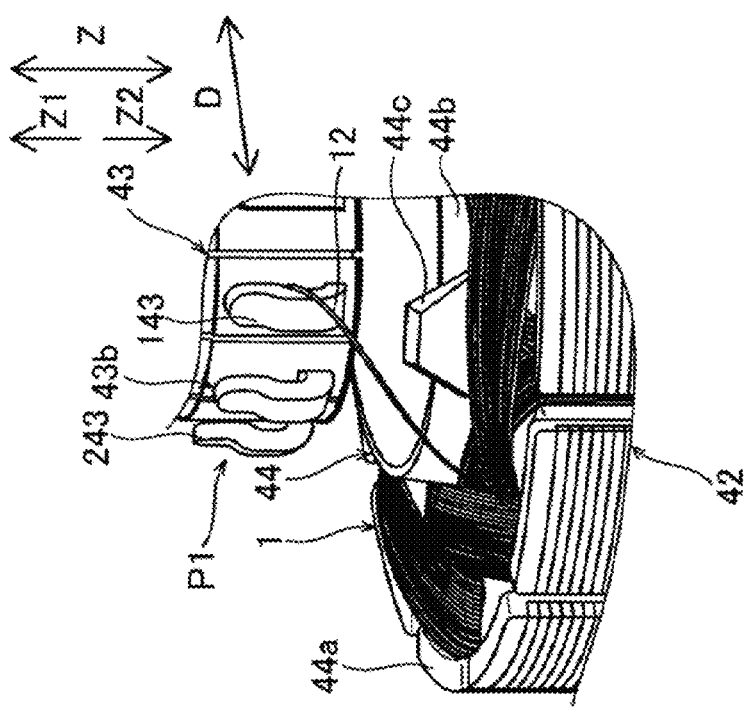
FIG. 5B is a perspective view of the rotating electrical machine after the repress-fit.
Figure 10:
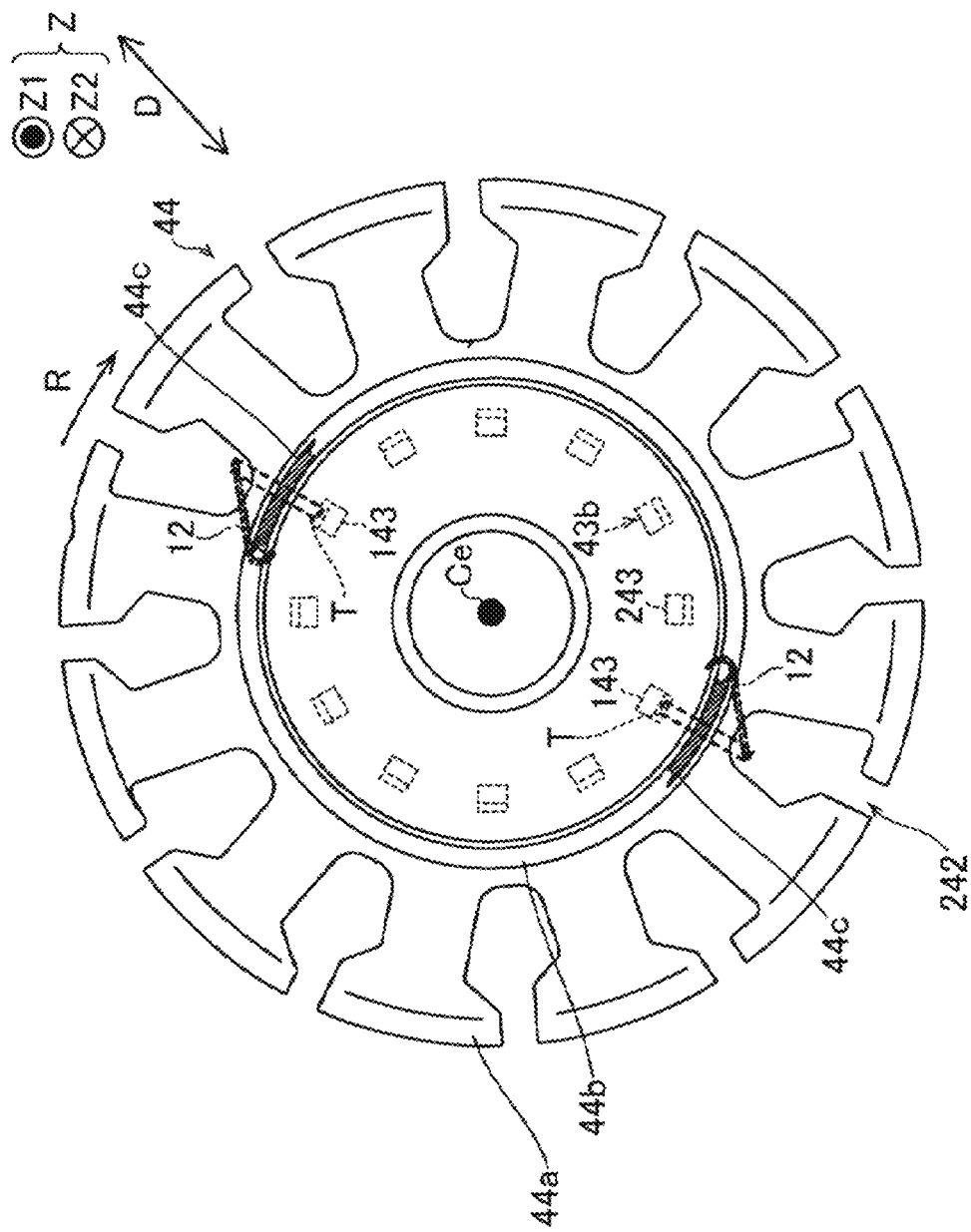
FIG. 10 is a plan view illustrating the protrusions of the insulator and the plural hooks of the rotating electrical machine of the embodiment.

The insulator 44 of the embodiment is configured to bypass or detour the end part 12 of the coil 1 from the predetermined slot 242 to the first hook 143 with respect to a shortest passage T shown in FIG. 10 after the repress-fit (see FIG. 3). That is, as shown in FIGS. 5A and 5B, the insulator 44 is configured to arrange the end part 12 of the coil 1 at the bypassed position or detoured position when the commutator 43 is repress-fitted into the rotor core 42 up to the predetermined position P2 after the end part 12 of the coil 1 is electrically connected to the first hook 143 while being pulled or tensioned at the position P1 away from the rotor core 42. Here, the length or the distance in which the end part 12 of the coil 1 bypasses or detours includes a longer than the second shortest distance M2 by the predetermined difference (looseness) between the first shortest distance M1 and the second shortest distance M2. It is preferable that the length in which the end part 12 of the coil 1 bypasses or detours may include a length slightly longer than a length in which the predetermined distance is added to the second shortest distance M2.

Figure 6:
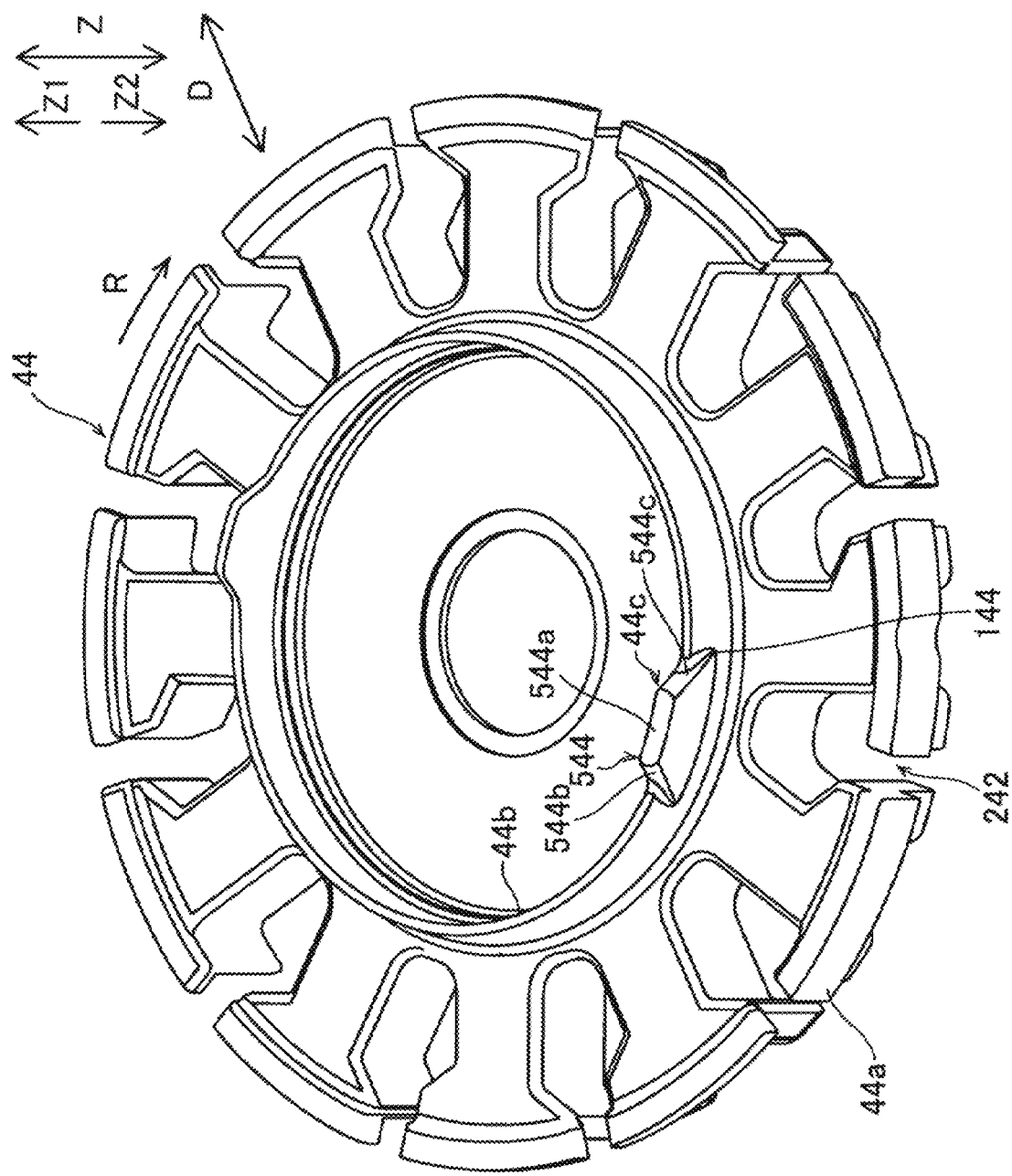
FIG. 6 is a perspective view of an insulator of the rotating electrical machine of the embodiment.

As shown in FIG. 6, more specifically, the insulator 44 includes a teeth cover portion 44a, an annular portion 44b, and the protrusions 44c.

The teeth cover portion 44a covers the plural teeth 42b. The teeth cover portion 44a is shaped in conformity with the plural teeth 42b.

The annular portion 44b is annularly formed when viewed in the Z1 direction. The annular portion 44b is arranged between the commutator 43 and the rotor core 42 after the repress-fit. In other words, the annular portion 44b is configured to cover the commutator 43 from outward in the D direction after re-press fit. The annular portion 44b is provided inwardly of the teeth cover portion 44a in the D direction. As such, the annular portion 44b protrudes opposite to the rotor core 42 (in the Z1 direction), and surrounds the plural hooks 43b which are aligned along the R direction.

The protrusion 44c is configured to guide the end part 12 of the coil 1 to a detoured position when the commutator 43 is repress-fitted into the rotor core 42 up to the predetermined position P2 after the end part 12 of the coil 1 is electrically connected to the first hook 143 at the position P1 away from the rotor core 42 in the pulled state or tensioned state. That is, the protrusion 44c helps the end part 12 of the coil 1 be arranged at the detoured position after the repress-fit.

Figure 7:
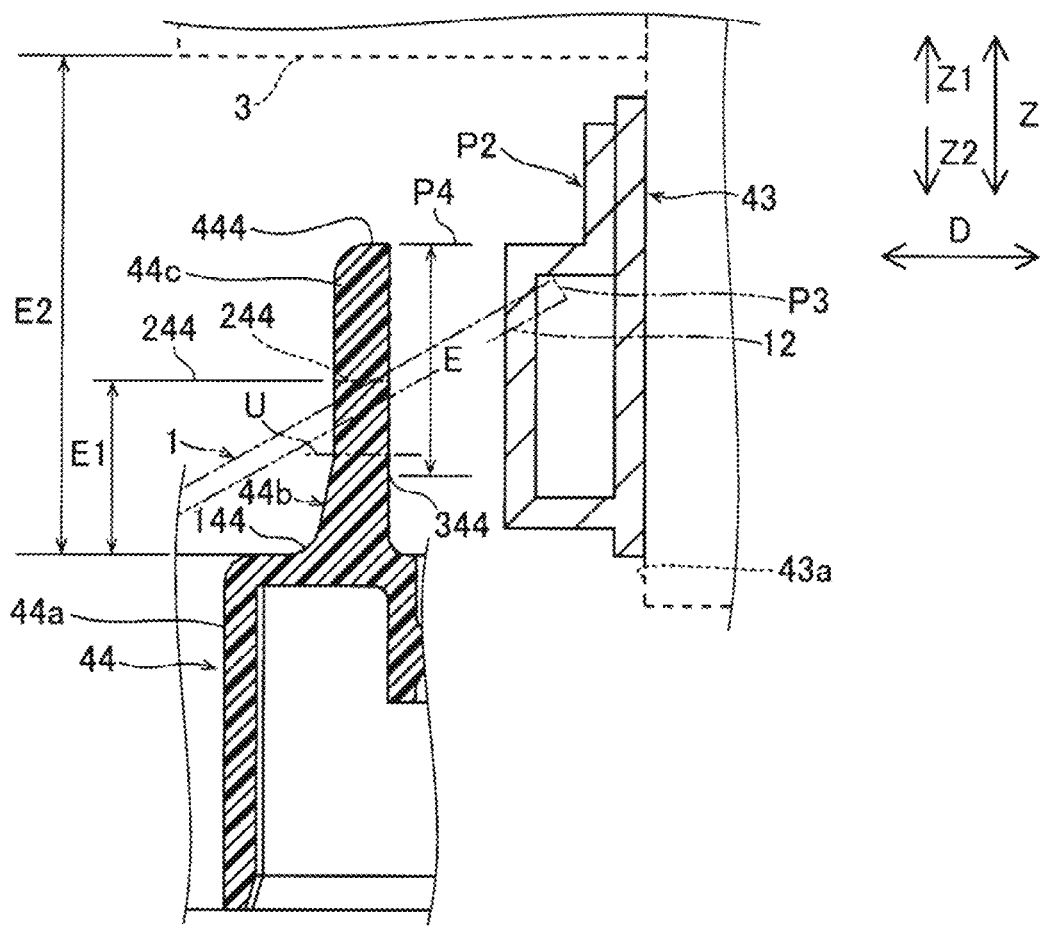
FIG. 7 is a cross sectional view of a protrusion and a first hook of the rotating electrical machine after the repress-fit.

In particular, as shown in FIGS. 6 and 7, the protrusion 44c protrudes opposite to the rotor core 42 (in the Z1 direction) relative to a distal end 244 of the annular portion 44b, the distal end 244 arranged opposite to the rotor core 42. That is, the protrusion 44c is provided to erect from a position between a base portion 144 of the outer circumferential surface of the annular portion 44b and the distal end 244. A base portion 344 of the protrusion 44c is, after the repress-fit, arranged close to a center position U of the outer circumferential surface of the annular portion 44b in the Z direction. A distal end portion 444 of the protrusion 44c is, after the repress-fit, arranged between the base portion 144 of the first hook 143 and the power-supply brush 3. Here, a connection position P3 where the end of the coil 1 is wound on the first hook 143 is arranged in the Z2 direction relative to a protrusion distal end position P4 of the protrusion 44c.

A protrusion length E of the protrusion 44c is formed or defined, after the repress-fit, equal to or longer than a length in which the looseness of the end part 12 of the coil 1 may be prevented and shorter than a length in which an excessive load is not applied to the end part 12 of the coil 1. In other words, it is favorable that the protrusion length E of the protrusion 44c corresponds to a length in which a predetermined difference (looseness) is added to the second shortest distance M2. In particular, the protrusion length E of the protrusion 44c is defined equal to or longer than a length E1 of the annular portion 44b in the Z direction and shorter than a length E2 which is from the base portion 144 of the annular portion 44b to the power supply brush 3.

Figure 8:
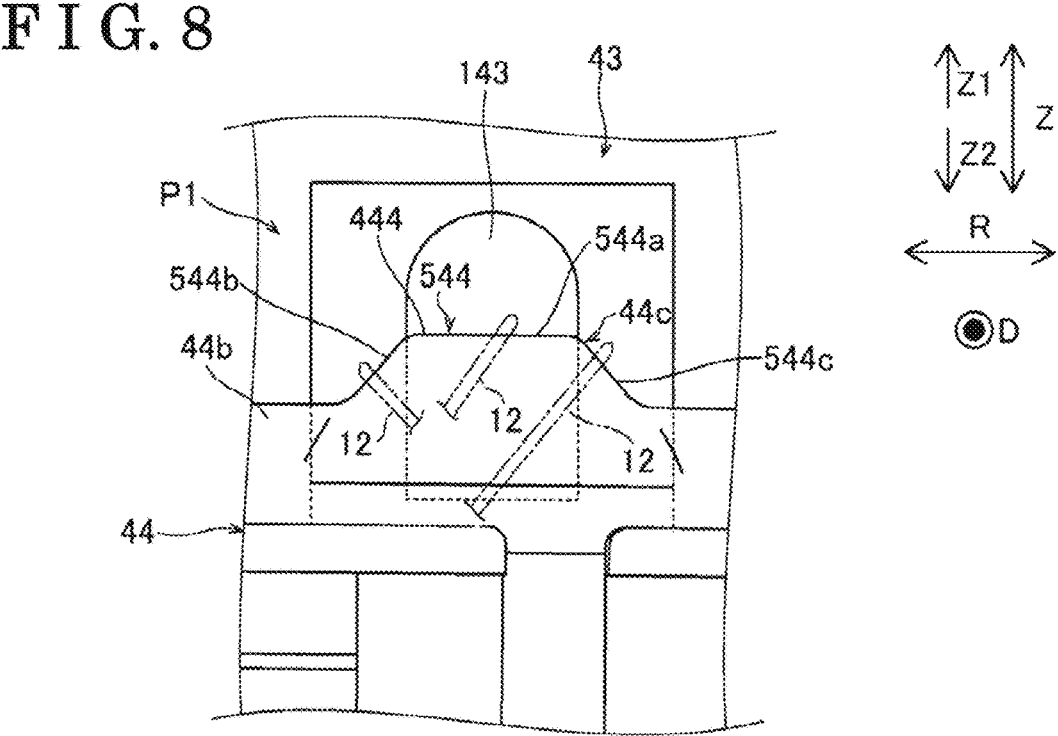
FIG. 8 is a front view of the protrusion and the first hook of the rotating electrical machine after the repress-fit.

As shown in FIGS. 7 and 8, the protrusion 44c is formed in a trapezoidal rib shape in which the width in the R direction reduces toward the distal end portion 444. In other words, the rib-shaped protrusion 44c is formed in a taper shape tapered in the Z1 direction when viewed from outward in the D direction. The rib-shaped protrusion 44c includes strength enough for load applied in a state where the end part 12 of the coil 1 is hooked at the time of the re-press fit. Specifically, the thickness of the rib-shaped protrusion 44c is thicker than a thickness of a part other than the annular portion 44b of the insulator 44 (the thickness of the teeth cover portion 44a) and thinner than the base portion 144 of the annular portion 44b in the D direction.

The protrusion 44c is configured such that the end part 12 of the coil 1 may be equally detoured by a predetermined difference (looseness) even in a case of being hooked at any part of a receiving face 544 of the protrusion 44c. In particular, the protrusion 44c includes the receiving face 544 to or with which the end part 12 of the coil 1 is hooked or in contact. The receiving face 544 is arranged at a position where the end part 12 of the coil 1 is detoured by a predetermined difference.

The receiving face 544 includes a first side surface 544a, a second side surface 544b, and a third side surface 544c. The first side surface 544a corresponds to a distal end surface of the protrusion 44c in a protruding direction thereof. The second and third surfaces 544b and 544c correspond to opposing end surfaces in the R direction. The second side surface 544*b* corresponds to an end surface of one side of the protrusion 44*c* in the R direction, and the third side surface 544*c* corresponds to an end surface of the other side of the protrusion 44*c* in the R direction. The first side surface 544*a*, the second side surface 544*b*, and the third surface 544*c* each detours the end part 12 of the coil 1 by the predetermined difference (looseness). The first side surface 544*a*, the second side surface 544*b*, and the third side surface 544*c* each is formed in a round shape along the R direction.

The protrusion 44*c* overlaps the first hook 143 when viewed outwardly in the D direction after the re-press fit. Here, the protrusion 44*c* at least overlaps the connection position P3 where the first hook position 143 and the end of the coil 1 are connected with each other when viewed outwardly in the D direction after the re-press fit.

Figure 9:
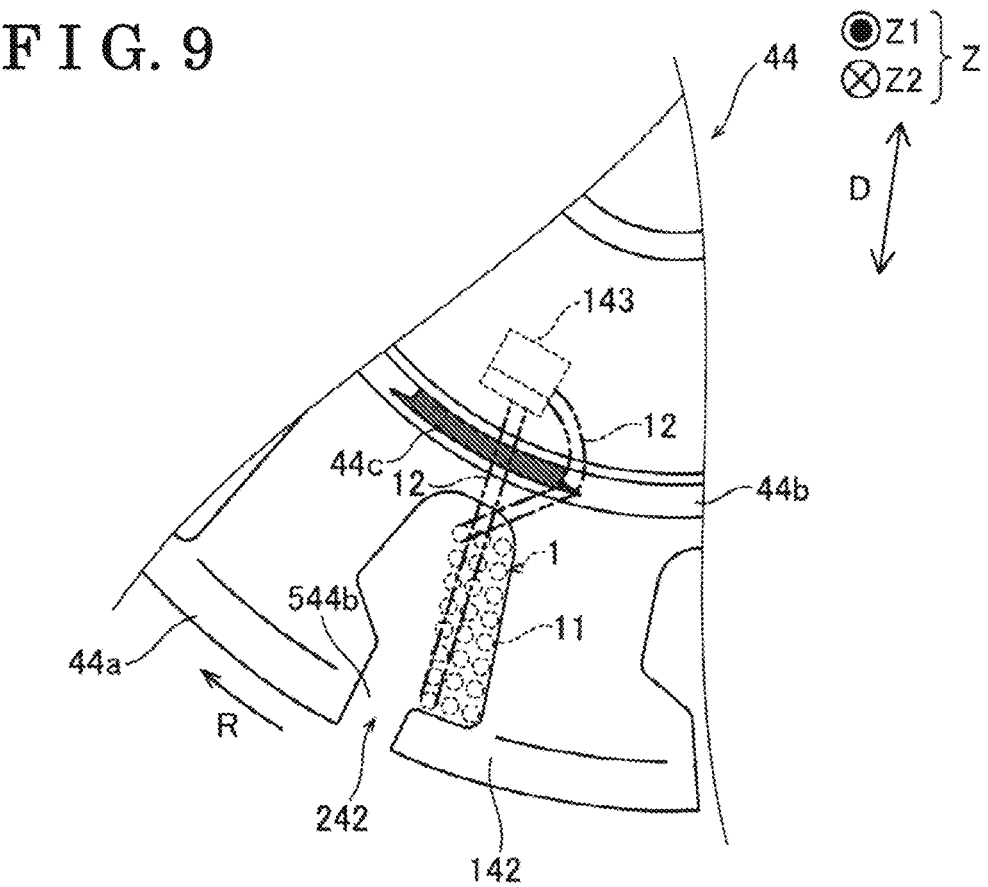
FIG. 9 is an enlarged view of the protrusion and the first hook of the insulator of the rotating electrical machine.

As shown in FIG. 9, the width of the protrusion 44*c* in the R direction includes a width in which the end part 12 of the coil 1 may be guided to a detoured position regardless of the position of the end part 12 within the predetermined slot 242. Here, as shown in FIG. 9, the protrusion 44*c* is shown with diagonal lines. Specifically, the width of the protrusion 44*c* in the R direction is greater than the greatest width of the slot 42*c* in the R direction and narrower than the greatest width of one of the teeth 42*b* in the R direction.

As illustrated in FIG. 10, the protrusion 44*c* is arranged on a shortest path T (i.e., a path) after the re-press fit where the end part 12 of the coil 1 passes through, the end part 12 connected to the first hook 143 from the predetermined tooth 142, and is hooked with the end part 12. Here, the protrusion 44*c* is shown with diagonal lines, and the plural hooks 43*b* are shown with dotted lines in FIG. 10. The protrusion 44*c* is arranged at a position to arrange the end part 12 of the coil 1 at a position displaced in the R direction or the Z1 direction from the shortest path T. In particular, the protrusion 44*c* is configured to arrange the end part 12 of the coil 1 at a detoured position instead of the shortest path T by displacing the end part 12 of the coil 1.

Here, the protrusion 44*c* extends along the R direction. A first area of the protrusion 44*c* is arranged on the shortest path T after the re-press fit in a plane view. Second areas other than the first part of the protrusions 44*c* are arranged at positions other than the shortest path T after the re-press fit in a plane view.

The protrusion 44*c* is arranged at positions corresponding to the positions of the first hooks 143 instead of positions corresponding to the positions of the second hooks 243. In other words, the protrusion 44*c* each faces the first hook 143 instead of the second hook 243. The protrusion 44*c* each is arranged at a position adjacent to the predetermined slot 242 in the D direction.

As shown in FIG. 10, the protrusions 44*c* are arranged at plural positions (for example, two positions). The protrusions 44*c* are arranged point-symmetrically with respect to a center point Ce of the shaft 41. The protrusion 44*c* is set or arranged depending on the position of the first hook 143.

Figure 11:
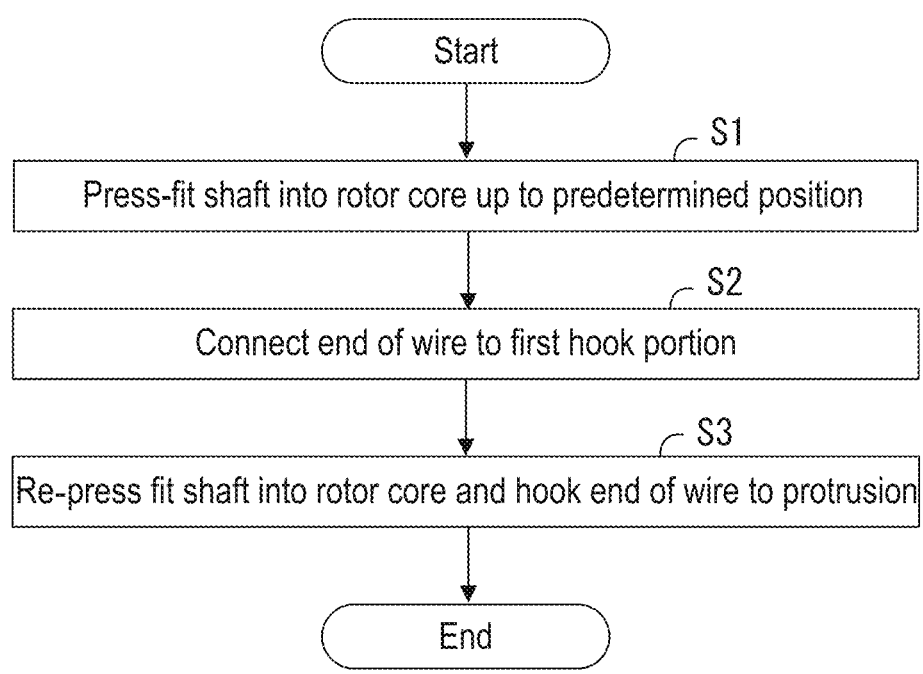
FIG. 11 is a flowchart explaining a manufacturing method of the rotating electrical machine of the embodiment.
Figure 12:
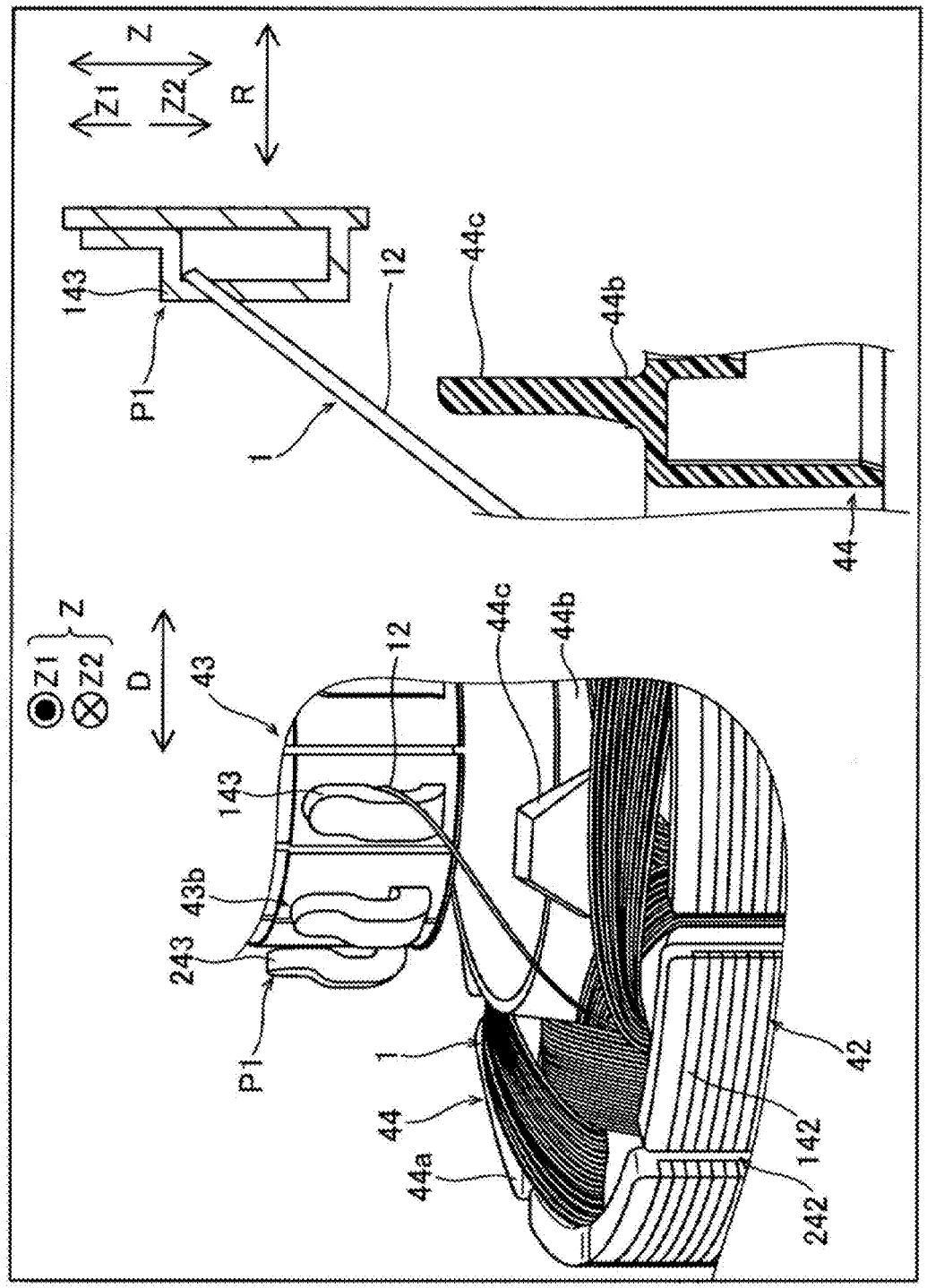
FIG. 12 is a perspective view and a cross sectional view of the rotating electrical machine of the embodiment before the repress-fit.
Figure 13:
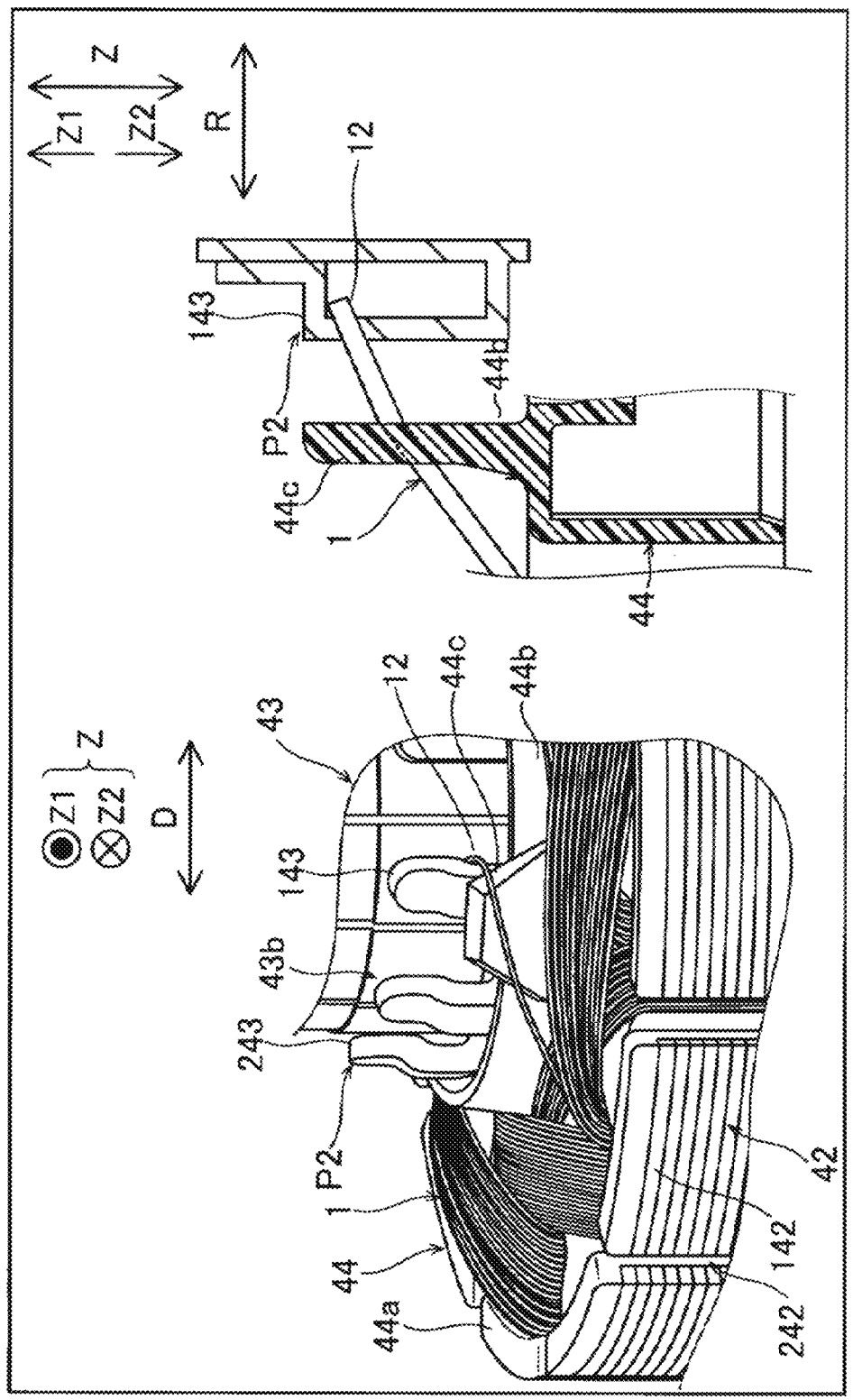
FIG. 13 is a perspective view and a cross sectional view of the rotating electrical machine of the embodiment after the repress-fit.

Hereinafter, a manufacturing method of the rotating electrical machine 100 will be explained with reference to FIGS. 11 to 13. The manufacturing method of the rotating electrical machine 100 is a method in which the shaft 41 press-fitted into the rotor core 42 is press-fitted into the commutator 43.

In Step S1, the shaft 41 is press-fitted into the rotor core 42 up to a predetermined position. Specifically, the insulator 44 is attached to the rotor core 42 including the plural teeth 42*b*, and the shaft 41 is press-fitted into the rotor core 42 to a predetermined position, the shaft 41 fixed with the commutator 43 including the plural hooks 43*b*.

In Step S2, the end of the coil 1 is connected to the first hook 143. That is, as shown in FIG. 12, after a process in which the shaft 41 fixed with the commutator 43 is press-fitted into the rotor core 42 up to the predetermined position, the coil 1 is wound on the predetermined tooth 142 of the plural teeth 42*b*, and the end of the coil 1 is connected to the first hook 143 of the plural hooks 43*b*.

In Step S3, the shaft 41 is repress-fitted into the rotor core 42, and the end part 12 of the coil 1 is hooked to the protrusion 44*c*. That is, as shown in FIG. 13, after the process in which the end of the coil 1 is connected to the first hook 143, the shaft 41 fixed with the commutator 43 is re-press-fitted into the rotor core 42, and the end part 12 of the coil 1 from the predetermined teeth 142 to the first hook 143 is hooked to the protrusion 44*c* of the insulator 44 arranged on the shortest path T of the end part 12 after the re-press fit. Here, the end part 12 of the coil 1 is arranged at the detoured position by the protrusion 44*c*.

According to the aforementioned embodiment, the following effects and advantages may be attained.

As described above, the protrusion 44*c* of the embodiment is arranged on the shortest path T where the end part 12 of the coil 1 passes from the predetermined tooth 142 to the first hook 143, and is hooked with the end part 12. Accordingly, the end part 12 of the coil 1 may be in the pulled state (tensioned state) by the protrusion 44*c* without increasing the protruding length of the annular portion 44*b*, and the parts other than the end part 12 of the coil 1 may be prevented from being hooked to the protrusion 44*c*. The protruding length of the annular portion 44*b* may be shorter than the protrusion 44*c*, and the parts other than the end part 12 of the coil 1 may be prevented from being broken by being hooked to the annular portion 44*b*. As a result, the protrusion 44*c* including sufficient protruding amount may be provided at the insulator 44, and the looseness of the coil 1 after the re-press fit may be sufficiently prevented while preventing the coil 1 from being broken by the annular portion 44*b*. The looseness of the coil 1 after the re-press fit may be sufficiently prevented, and the coil 1 may be prevented from being broken due to jumping outward of the rotor core 42. The looseness of the coil 1 may be sufficiently prevented after the re-press fit only by winding the coil 1 to the rotor core 42 instead of using, for example, a resin material for fixing the coil 1 or a material melted at equal to or higher than a predetermined temperature level to cover the coil 1 to prevent the looseness of the coil 1, meaning that the looseness of the coil 1 after the re-press fit may be easily prevented.

In the embodiment, as described above, the plural hooks 43*b* include the second hooks 243 which are other than the first hooks 143, the second hoof portions 243 which are not connected with the end of the coil 1 wound on the predetermined teeth 142, and the protrusions 44*c* each is arranged at a position corresponding to the position of the first hooks 143 instead of being arranged at a position corresponding to a position of the second hook 243. The protrusion 44*c* is arranged only at the position where being certainly or securely required, and the parts other than the end part 12 of the coil 1 may be effectively prevented from being hooked to the protrusion 44*c*. Thus, the parts other than the end part 12 of the coil 1 may be prevented from being broken by being hooked to the protrusion 44*c*.

In the embodiment, as described above, the protrusion 44*c* is formed in the trapezoidal rib shape having the width in the R direction decreasing towards the distal end portion 444.

Thus, unlike a case where the protrusion 44c is formed in a rectangular shape, even in a case where the end part 12 of the coil 1 is hooked to any parts of the protrusion 44c, the end of the coil 1 may be connected to the first hook 143 in a state of being detoured by substantially the same distance relative to the shortest path T of the end part 12 of the coil 1 after the re-press fit, the shortest path T from the predetermined tooth 142 to the first hook 143. The protrusion 44c is formed in the trapezoidal rib shape, and the dimension of the distal end portion 444 of the protrusion 44c is greater than a case where the protrusion 44c is formed in a round rib shape, and the protrusion 44c may be formed without the precise management of the dimension of the distal end portion 444 of the protrusion 44c. As a result, the protrusion 44c may be easily formed at the annular portion 44b. The protrusion 44c is formed in the trapezoidal rib shape and the width of the protrusion 44c in the R direction may be greater than a protrusion being formed in a stick shape, and the end part 12 of the coil 1 may be securely hooked to the protrusion 44c.

In the embodiment, as described above, the rib-shaped protrusion 44c is provided to erect between the base portion 144 of the outer circumferential surface of the annular portion 44b and the distal end 244. Thus, the protrusion 44c may include the thickness of the rib-shaped portion in addition to the thickness of the annular portion 44b, and the protrusion 44c may include sufficient thickness. As a result, the protrusion 44c may be prevented from being deflected or bent when the end part 12 of the coil 1 is hooked, and the looseness of the coil 1 after the re-press fit may be securely prevented.

In the embodiment, as described above, the connection position P3 is arranged at a side where the rotor core 42 is provided in the extending direction of the shaft 41 relative to the protrusion distal end position P4 of the protrusion 44c, the connection position P3 where the first hook 143 and the end of the coil 1 are connected with each other. Thus, the looseness of the coil 1 after the re-press fit may be securely prevented as the end part 12 of the coil 1 may be securely hooked to the protrusion 44c to make the coil 1 be in the tensioned state.

In the embodiment, as described above, the manufacturing method of the rotating electrical machine 100 includes Step S3 in which the shaft 41 is re-press-fitted into the rotor core 42 and the end part 12 of the coil 1 is hooked to the protrusion 44c of the insulator 44. According to the aforementioned manufacturing method, the rotating electrical machine 100 in which the end part 12 of the coil 1 is hooked to the protrusion 44c and the looseness of the coil 1 after the re-press fit may be sufficiently prevented may be provided. As the looseness of the coil 1 after the re-press fit may be sufficiently prevented, even in a case where the length of the end part 12 of the coil 1 is increased, and the commutator 43 fixed to the shaft 41 is re-press-fitted into the rotor core 42 deeper than the embodiment, the looseness of the coil 1 after the re-press fit may hardly be occurred.

Modified examples of the embodiment may be described below.

For example, in the aforementioned embodiment, the coil portion 11 of the coil 1 is wound over the plural (for example, three) teeth 42b by the distribute winding. Alternatively, the coil portion 11 may be wound by the distribute winding over two or equal to or more than four teeth. The coil portion 11 may be wound on the teeth 42b by the concentrated winding.

In the aforementioned embodiment, the first hooks 143 are arranged at the plural (for example, two) positions. Alternatively, the first hook 143 may be arranged at a single position or equal to or more than three positions.

In the aforementioned embodiment, the protrusions 44c are arranged at the plural (for example, two) positions. Alternatively, it is only required that the protrusion 44c aligns the end part 12 of the coil 1, and the protrusion 44c may be arranged at a single position or the protrusions 44c may be arranged at equal to or more than three positions.

The protrusion 44c includes the receiving face 544 to or with which the end part 12 of the coil 1 is hooked or in contact. Alternatively, the protrusion 44c includes a receiving surface including a recess into which the end part 12 of the coil 1 is fitted.

In the aforementioned embodiment, the protrusion 44c is formed in the trapezoidal rib shape decreasing the width thereof in the R direction towards the distal end portion 444. Alternatively, the protrusion 44c may be formed in a circular rib shape in which the width of the protrusion 44c in the R direction decreases towards the distal end portion 444.

In the aforementioned embodiment, the protrusion 44c is provided to erect between the base portion 144 of the outer circumferential surface of the annular portion 44b and the distal end 244. Alternatively, the protrusion may be provided to erect from the base portion 144 of the outer circumferential surface of the annular portion 44b.

According to an aspect of the aforementioned embodiment, the rotating electrical machine (100) includes the coil (1), the rotor (4) including the shaft (41), the rotor core (42) including the plural teeth (42b) on which the coil (1) is wound, the commutator (43) including the plural hooks (43b) being provided with the first hook (143) to which the end of the coil (1) is connected, the coil (1) wound on the predetermined tooth (142) of the plural teeth (42b), and the insulator (44) attached to the rotor core (42), and the stator (3) arranged to face the rotor (4) in a radial direction thereof. The insulator (44) includes the annular portion (44b) protruding opposite to the rotor core (42), the annular portion (44b) provided to surround the plural hooks (43b) which are aligned along the circumferential direction of the shaft (41), and the protrusion (44c) protruding opposite to the rotor core (42) relative to the distal end of the annular portion (44b), the distal end arranged opposite to the rotor core (42). The protrusion (44c) is arranged on the path where the end part (12) of the coil (1) passes through, the end part (12) corresponding to the part from the predetermined tooth (142) to the end of the coil (1) connected to the first hook (143), the protrusion (44c) being hooked by the end part (12).

According to an aspect of the rotating electrical machine 100 of the embodiment, as described above, the protrusion 44c of the embodiment is arranged on the shortest path T where the end part 12 of the coil 1 passes from the predetermined tooth 142 to the first hook 143, and is hooked with the end part 12. Accordingly, the end part 12 of the coil 1 may be in the pulled state (tensioned state) by the protrusion 44c without increasing the protruding length of the annular portion 44b, and the parts other than the end part 12 of the coil 1 may be prevented from being hooked to the protrusion 44c. The protruding length of the annular portion 44b may be shorter than the protrusion 44c, and the parts other than the end part 12 of the coil 1 may be prevented from being broken by being hooked to the annular portion 44b. As a result, the protrusion 44c including sufficient protruding amount may be provided at the insulator 44, and the looseness of the coil 1 after the re-press fit may be sufficiently prevented while preventing the coil 1 from being broken by the annular portion 44b. The looseness of the coil 1 after the re-press fit may be sufficiently prevented, and the coil 1 may be prevented from being broken due to jumping outward of the rotor core 42. The looseness of the coil 1 may be sufficiently prevented after the re-press fit only by winding the coil 1 to the rotor core 42 instead of using, for example, a resin material for fixing the coil 1 or a material melted at equal to or higher than a predetermined temperature level to cover the coil 1 to prevent the looseness of the coil 1, meaning that the looseness of the coil 1 after the re-press fit may be easily prevented.

According to another aspect of the aforementioned embodiment, the plural hooks (43b) further includes the second hook (243) which is other than the first hook (143), the second hook (243) to which the end of the coil (1) wound on the predetermined tooth is not connected, and the protrusion is arranged at a position corresponding to a position of the first hook (143) instead of being arranged at a position corresponding to a position of the second hook (243).

According to the aforementioned configuration, the protrusion 44c is arranged only at the position where being certainly or securely required, and the parts other than the end part 12 of the coil 1 may be effectively prevented from being hooked to the protrusion 44c. Thus, the parts other than the end part 12 of the coil 1 may be prevented from being broken by being hooked to the protrusion 44c.

According to still further aspect of the embodiment, the protrusion (44c) is formed in the trapezoidal rib shape decreasing the width in the circumferential direction toward a protruding end thereof.

According to the aforementioned embodiment, unlike a case where the protrusion 44c is formed in a rectangular shape, even in a case where the end part 12 of the coil 1 is hooked to any parts of the protrusion 44c, the end of the coil 1 may be connected to the first hook 143 in a state of being detoured by substantially the same distance relative to the shortest path T of the end part 12 of the coil 1 after the re-press fit, the shortest path T from the predetermined tooth 142 to the first hook 143. The protrusion 44c is formed in the trapezoidal rib shape, and the dimension of the distal end portion 444 of the protrusion 44c is greater than a case where the protrusion 44c is formed in a round rib shape, and the protrusion 44c may be formed without the precise management of the dimension of the distal end portion 444 of the protrusion 44c. As a result, the protrusion 44c may be easily formed at the annular portion 44b. The protrusion 44c is formed in the trapezoidal rib shape and the width of the protrusion 44c in the R direction may be greater than a protrusion being formed in a stick shape, and the end part 12 of the coil 1 may be securely hooked to the protrusion 44c.

In this case, it is favorable that the rib-shaped protrusion (44c) is provided to protrude opposite to the rotor core (42) from between the base portion (144) of the outer circumferential surface and the distal end (244) of the annular portion (44b).

According to the aforementioned embodiment, the protrusion 44c may include the thickness of the rib-shaped portion in addition to the thickness of the annular portion 44b, and the protrusion 44c may include sufficient thickness. As a result, the protrusion 44c may be prevented from being deflected or bent when the end part 12 of the coil 1 is hooked, and the looseness of the coil 1 after the re-press fit may be securely prevented.

According to still further aspect of the embodiment, the protrusion (44c) includes the distal end surface (544a) in the protruding direction thereof and opposing end surfaces (544b, 544c) in the circumferential direction thereof, the distal end surface (544a) and the opposing end surfaces (544b, 544c) formed in a round shape along a radial direction of the protrusion (44c).

According to the aforementioned configuration, the load applied to the end part (12) of the coil (1) in a state of being hooked by the protrusion (44c) may be balanced or distributed, and the end part (12) of the coil (1) may be inhibited from being broken.

According to still another aspect of the embodiment, the protrusion (44c) includes the plural protrusions (44c) arranged point-symmetrically with respect to the center point (Ce) of the shaft (41).

According to the aforementioned configuration, even in a case where the coil (1) starts being wound on the teeth (42b) from the point-symmetric position and the end parts (12) of the coil (1) are connected to the corresponding plural first hooks (143), the end parts (12) of the coil (1) may be hooked by the protrusions (44c) and the coil (1) may be inhibited from loosening.

According to another aspect of the embodiment, the end of the coil (1) is connected to the part of the first hook (143), the part arranged at a side where the rotor core (42) is provided in an extending direction of the shaft (41) relative to a position where a protruding end of the protrusion (44c) is arranged.

According to the aforementioned embodiment, the looseness of the coil 1 after the re-press fit may be securely prevented as the end part 12 of the coil 1 may be securely hooked to the protrusion 44c to make the coil 1 in the tensioned state.

According to the aforementioned embodiment, the manufacturing method of the rotating electrical machine (100) including processes of press-fitting a shaft (41) fixed with the commutator (43) which includes plural hooks (43b) into a rotor core (42) including plural teeth (42b) up to a predetermined position in a state where the rotor core (42) is attached with the insulator (44) including an annular portion (44b) which is arranged to surround the plural hooks (43b) and the protrusion (44c) protruding opposite to the rotor core (42) relative to the distal end (244) of the annular portion (44b), winding the coil (1) to the predetermined tooth (142) of the plural teeth (42b) and connecting the end of the coil (1) to the predetermined hook (143) of the plural hooks (43b) after the press-fitting process of the shaft (41) fixed with the commutator up to the predetermined position, and re-press fitting the shaft (41) fixed with the commutator into the rotor core (42) and hooking an end part of the coil (1), the end part (1) corresponding to an area from a part connected to the predetermined tooth (142) to the end of the coil (1) connected to the predetermined hook (143), to the protrusion (44c) of the insulator arranged on a path of the end part of the coil (1) after the end of the coil (1) is connected to the predetermined hook.

According to another aspect of the manufacturing method of the rotating electrical machine 100 of the embodiment, as described above, the manufacturing method of the rotating electrical machine 100 includes Step S3 in which the shaft 41 is re-press-fitted into the rotor core 42 and the end part 12 of the coil 1 is hooked to the protrusion 44c of the insulator 44. According to the aforementioned manufacturing method, the rotating electrical machine 100 in which the end part 12 of the coil 1 is hooked to the protrusion 44c and the looseness of the coil 1 after the re-press fit may be sufficiently prevented may be provided. As the looseness of the coil 1 after the re-press fit may be sufficiently prevented, even in a case where the length of the end part 12 of the coil 1 is increased, and the commutator 43 fixed to the shaft 41 is re-press-fitted into the rotor core 42 deeper than the embodiment, the looseness of the coil 1 after the re-press fit may hardly be occurred.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A rotating electrical machine, comprising:
   a coil;
   a rotor including
      a shaft;
      a rotor core including a plurality of teeth on which the coil is wound;
      a commutator including a plurality of hooks being provided with a first hook to which an end of the coil is connected, the coil wound on a predetermined tooth of the plurality of teeth; and
      an insulator attached to the rotor core; and
   a stator arranged to face the rotor in a radial direction thereof; wherein
   the insulator includes
      an annular portion protruding opposite to the rotor core, the annular portion provided to surround the plurality of hooks which are aligned along a circumferential direction of the shaft; and
      one or more protrusions protruding opposite to the rotor core relative to a distal end of the annular portion, the distal end arranged opposite to the rotor core;
   a first protrusion of the one or more protrusions is arranged on a path where an end part of the coil passes through, the end part corresponding to an area from a part connected to the predetermined tooth to the end of the coil connected to the first hook, the protrusion being hooked by the end part;
   the plurality of hooks further includes a second hook which is other than the first hook, the second hook to which the end of the coil wound on the predetermined tooth is not connected;
   the first protrusion of the one or more protrusions is arranged at a same circumferential position as the first hook; and
   none of the one or more protrusions is arranged at a same circumferential position as the second hook.

2. The rotating electrical machine according to claim 1, wherein the protrusion is formed in a trapezoidal rib shape decreasing in width in a circumferential direction toward a protruding end thereof.

3. The rotating electrical machine according to claim 2, wherein the rib-shaped protrusion is provided to protrude opposite to the rotor core from between a base portion of an outer circumferential surface and the distal end of the annular portion.

4. The rotating electrical machine according to claim 2, wherein the protrusion includes a distal end surface in a protruding direction thereof and opposing end surfaces in the circumferential direction thereof, the distal end surface and the opposing end surfaces formed in a round shape along a radial direction of the protrusion.

5. The rotating electrical machine according to claim 2, wherein the protrusion includes a plurality of protrusions arranged point-symmetrically with respect to a center point of the shaft.

6. The rotating electrical machine according to claim 1, wherein the end of the coil is connected to a part of the first hook, the part arranged at a side where the rotor core is provided in an extending direction of the shaft relative to a position where a protruding end of the protrusion is arranged.

7. A manufacturing method of a rotating electrical machine including processes of;

press-fitting a shaft fixed with a commutator which includes a plurality of hooks into a rotor core including a plurality of teeth up to a predetermined position in a state where the rotor core is attached with an insulator including an annular portion which is arranged to surround the plurality of hooks and one or more protrusions protruding opposite to the rotor core relative to a distal end of the annular portion;

winding the coil to the predetermined tooth of the plurality of teeth and connecting an end of the coil to a predetermined hook of the plurality of hooks after the press-fitting process of the shaft fixed with the commutator up to the predetermined position; and re-press fitting the shaft fixed with the commutator into the rotor core and hooking an end part of the coil, the end part corresponding to an area from a part connected to the predetermined tooth to the end of the coil connected to the predetermined hook, to a first protrusion of the one or more protrusions of the insulator arranged on a path of the end part of the coil after the end of the coil is connected to the predetermined hook; wherein the plurality of hooks further includes a second hook which is other than the first hook, the second hook to which the end of the coil wound on the predetermined tooth is not connected;

the first protrusion of the one or more protrusions is arranged at a same circumferential position as the first hook; and none of the one or more protrusions is arranged at a same circumferential position as the second hook.

* * * * *